US009571021B2

(12) United States Patent
Takada et al.

(10) Patent No.: US 9,571,021 B2
(45) Date of Patent: Feb. 14, 2017

(54) MOTOR CONTROL DEVICE AND METHOD FOR DETECTING OUT-OF-STEP

(71) Applicant: MINEBEA CO., LTD., Kitasaku-Gun, Nagano (JP)

(72) Inventors: Kazuo Takada, Kosai (JP); Takayuki Matsui, Toyohashi (JP)

(73) Assignee: Minebea Co., Ltd., Nagano (JP)

( * ) Notice: Subject to any disclaimer, the term of this patent is extended or adjusted under 35 U.S.C. 154(b) by 162 days.

(21) Appl. No.: 14/546,342

(22) Filed: Nov. 18, 2014

(65) Prior Publication Data
US 2015/0214878 A1 Jul. 30, 2015

(30) Foreign Application Priority Data
Jan. 29, 2014 (JP) .................................. 2014-014107

(51) Int. Cl.
 *H02P 8/12* (2006.01)
 *H02P 8/34* (2006.01)
 *H02P 8/38* (2006.01)

(52) U.S. Cl.
 CPC ....................................... *H02P 8/38* (2013.01)

(58) Field of Classification Search
 CPC ................. H02P 8/34; H02P 8/36; H02P 8/38; H02P 8/00; H02P 8/12; H02P 8/24
 USPC ................................................ 318/685, 696
 IPC ................... H02P 8/34, 8/36, 8/38, 8/00, 8/12, H02P 8/24
 See application file for complete search history.

(56) References Cited

U.S. PATENT DOCUMENTS

| 6,879,128 | B2 * | 4/2005 | Coutu ....................... | H02P 8/12 318/599 |
| 7,560,893 | B2 * | 7/2009 | Thomson .................. | H02P 8/12 318/400.11 |
| 8,174,223 | B2 | 5/2012 | Takada et al. | |
| 8,466,648 | B2 * | 6/2013 | Takada ..................... | H02P 8/38 242/421 |

(Continued)

FOREIGN PATENT DOCUMENTS

| EP | 1 460 757 A1 | 9/2004 |
| EP | 1 650 571 A1 | 4/2006 |

(Continued)

OTHER PUBLICATIONS

Machine translation of Japanese Publication No. JP 2012-016221A. Translating Japanese to English.*

(Continued)

*Primary Examiner* — Bentsu Ro
(74) *Attorney, Agent, or Firm* — Carrier Blackman & Associates, P.C.; Joseph P. Carrier; Jeffrey T. Gedeon (57) ABSTRACT

There is provided a motor control device for controlling a stepping motor having at least two coils. The motor control device includes a controller applies a pulse voltage being subjected to pulse width modulation to each of the coils and provides a stop period to a target coil being subjected to switching of a direction of the coil current, during which the application of the pulse voltage to the target coil is temporarily stopped. The controller also performs a control to set on-duty of the pulse voltage applied to all of the coils except the target coil to be either 100% or 0% during the stop period. An out-of step of the stepping motor is detected when a back electromotive voltage induced in the target coil during the stop period satisfies a predetermined out-of-step determination criterion.

10 Claims, 9 Drawing Sheets

(56) References Cited

U.S. PATENT DOCUMENTS 8,896,257 B2 * 11/2014 Takada .................. H02P 8/38
318/685

FOREIGN PATENT DOCUMENTS

| JP | 2006-064437 | 3/2006 |
| JP | 2009-261045 A | 11/2009 |
| JP | 2012-016221 A | 1/2012 |

OTHER PUBLICATIONS

Japanese Office Action issued on Dec. 1, 2015 in the corresponding JP Patent Application 2014-014107, Date: Dec. 2015.

* cited by examiner

MOTOR CONTROL DEVICE AND METHOD FOR DETECTING OUT-OF-STEP

BACKGROUND OF THE INVENTION

1. Field of the Invention

The present invention relates to a motor control device and a method for detecting out-of-step and particularly to a motor control device for controlling a stepping motor and a method for detecting out-of-step in the stepping motor.

2. Description of the Related Art

A stepping motor is a motor which is driven in synchronous with pulsed power. The stepping motor is able to realize an accurate positioning control with a simple circuit configuration. For example, the stepping motor is used as an actuator for an air conditioning unit installed in a vehicle. In a usage of the stepping motor, it sometimes happen that synchronization between an input pulse signal and rotation of a motor is lost and thus the control of the stepping motor is disturbed when an excessive load or a sudden change in speed occurs. This state is referred to as "out-of-step."

Techniques for detecting the out-of-step of the stepping motor are disclosed in documents such as EP 1460757 A1, JP-A-2009-261045 and JP-A-2012-016221.

EP 1460757 A1 discloses an out-of-step detection technique to provide a stop period in a period of each step unit in a control signal of a stepping motor. In the stop period, supply of control signal is stopped only by a time short enough to not affect the rotation of the stepping motor. The technique disclosed in EP 1460757 A1 detects an out-of-step of the stepping motor by measuring a back electromotive voltage induced in a coil during the stop period.

JP-A-2009-261045 discloses a technique which allows a stepping motor to be used in the maximum torque and detects an out-of-step while the stepping motor is driven by the technique disclosed in EP 1460757 A1. In the solving means section of the Abstract of JP-A-2009-261045, a configuration is disclosed in which a means 5 for supplying a control current to coils 4 of each phase so as to drive a stepping motor 1 and a means for separately measuring back electromotive voltages (VA, VB) induced in each of the coils of each phase are used to stop the control current of the coils of the each phase in the order of each phase by a time t that is short enough not affecting the rotation of the stepping motor at a predetermined time (T1 to T6) during one step stepping of a rotor 3 of the stepping motor and to measure the back electromotive voltages during the stop. In this way, the out-of-step is detected when the measurement results in at least one phase coil meet a predetermined out-of-step determination criterion.

Figure 8A:
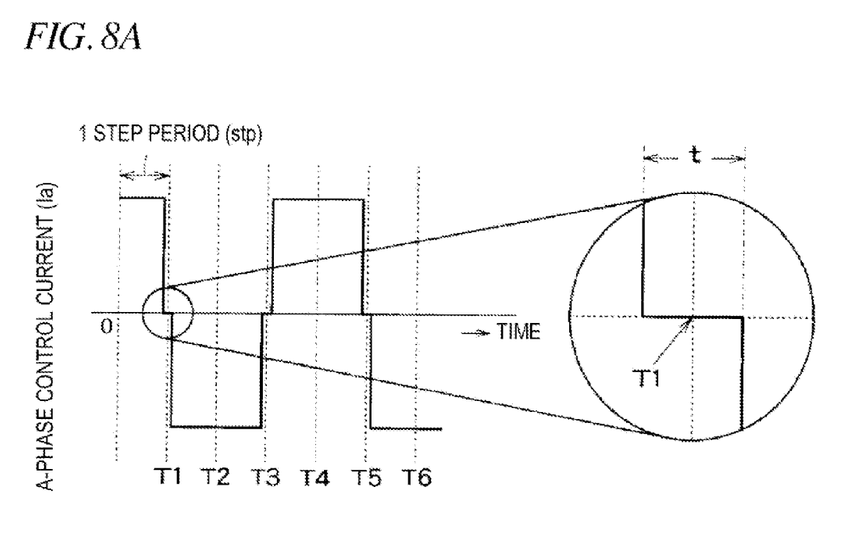
FIGS. 8A and 8B are explanatory views showing an out-of-step detecting operation of a comparative example.
Figure 8B:
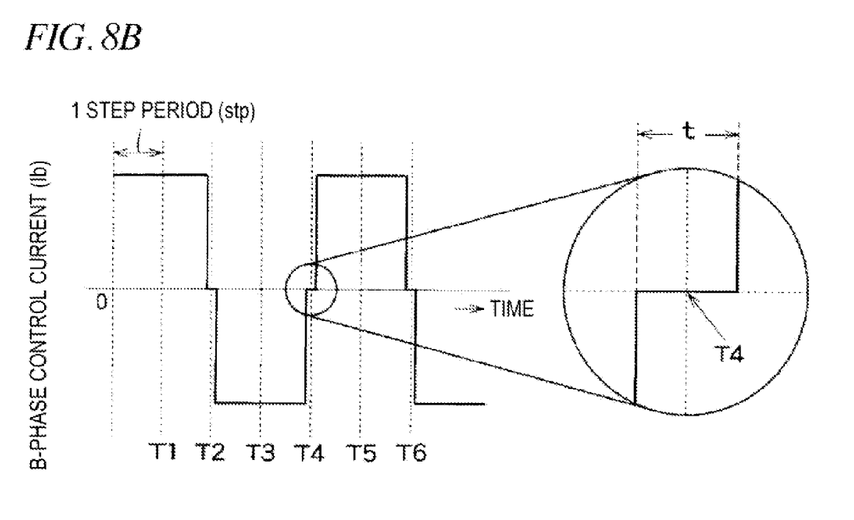

FIGS. 8A and 8B are explanatory views showing an operation of detecting an out-of-step of a motor according to a comparative example, which is disclosed in JP-A-2009-261045.

FIG. 8A is a time chart showing an A-phase control current. A circle shown on the right is an enlarged view of a part near time T1.

Time T1 to T6 indicates each time during one step stepping of a rotor of a stepping motor according to the comparative example.

Macroscopically, the A-phase control current flows in a positive direction at time 0 to T1, flows in a reverse direction at time T1 to T3 and flows in a positive direction at time T3 to T5.

Microscopically, the A-phase control current becomes zero over a time interval t near time T1. This time interval is often referred to as "energizing stop period." The motor control device detects an out-of-step by measuring a back electromotive voltage of the A-phase coil during the energizing stop period.

FIG. 8B is a time chart showing a B-phase control current. A circle shown on the right is an enlarged view of a part near time T4.

Time T1 to T6 indicates each time during 1 step stepping of the rotor of the stepping motor according to the comparative example.

Macroscopically, the B-phase control current flows in a positive direction at time 0 to T2, flows in a reverse direction at time T2 to T4 and flows in a positive direction at time T4 to T6.

Microscopically, the B-phase control current becomes zero over a time interval t near time T4. The motor control device detects an out-of-step by measuring a back electromotive voltage of the B-phase coil during the energizing stop period.

Figure 9:
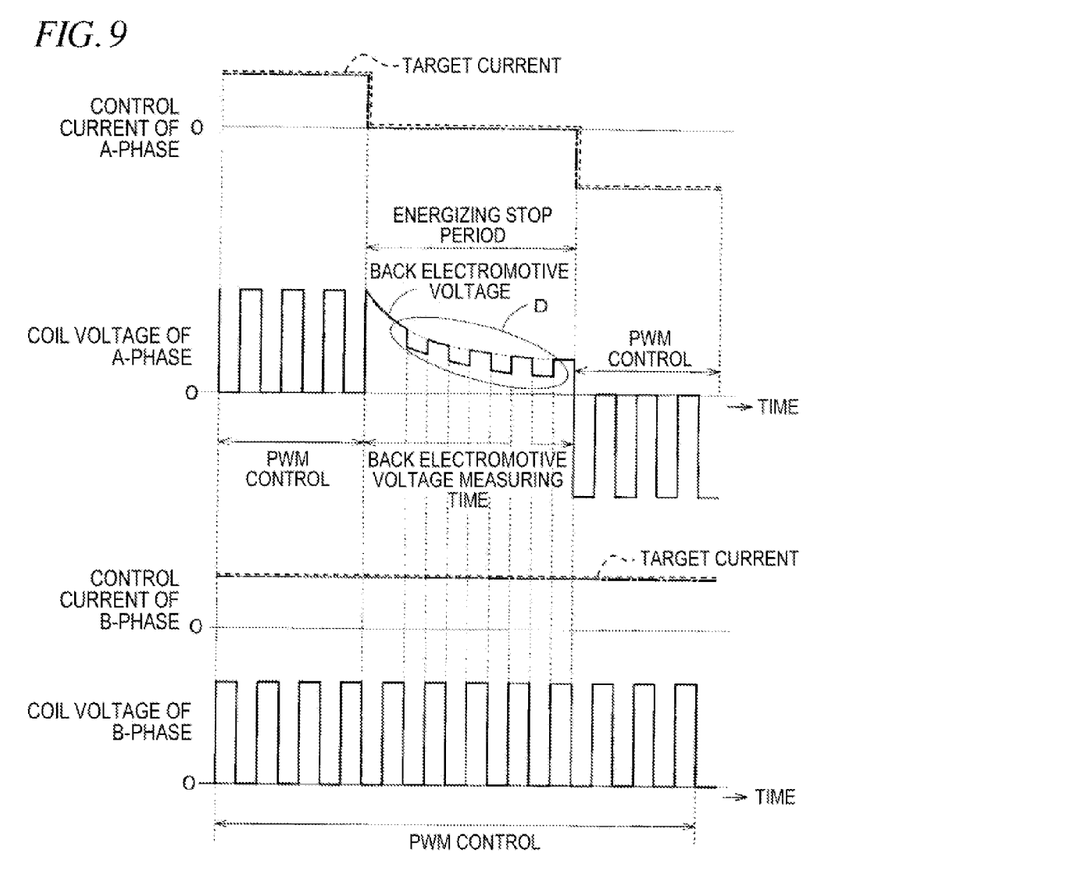
FIG. 9 is a partially enlarged view of FIGS. 8A and 8B.

FIG. 9 is an enlarged view of a part near time T1 in FIGS. 8A and 8B. In a waveform diagram of each phase control current, a solid line indicates a control current and a dashed line indicates a target current. In the comparative example, both the A-phase coil and the B-phase coil are controlled while the control current flowing through the A-phase coil and the B-phase coil is set to the target current value.

As shown in FIG. 9, when the A-phase control current is a positive value, a pulse voltage having a predetermined duty is applied to the A-phase coil.

During a time period in which the A-phase control current is zero, which corresponds to the energizing stop period, a back electromotive voltage is generated in the A-phase coil. An out-of-step of the stepping motor can be detected by the back electromotive voltage. At this time, a pulse voltage having a predetermined duty is applied to the B-phase coil. As shown by an ellipse labeled "D" in FIG. 9, noise generated in the on-off switching of energizing executed by a pulse width modulation (hereinafter, referred to as PWM) is superimposed on a waveform of a back electromotive voltage of the A-phase coil during the energizing stop.

In the object section of the Abstract of JP-A-2012-016221, it is disclosed that the detection precision of an out-of-step of a stepping motor is improved. In the solving means section of the Abstract of JP-A-2012-016221, a motor control device 10 is disclosed in which a controller applies a pulse voltage subjected to pulse width modulation to each of coils of a stepping motor 20. The stepping motor 20 includes at least two phase coils, through which coil currents having different phases flow, respectively, and a rotor configured to rotate by periodically switching a phase of the coil current flowing through each phase coil. A back electromotive voltage measuring unit 126 provides a stop period where the application of the pulse voltage to the coil is temporarily stopped when a direction of the coil current flowing through one phase coil is switched and measures a back electromotive voltage induced in the one phase coil during the stop period. An out-of-step detecting unit detects an out-of-step of the stepping motor 20 when the measured back electromotive voltage meets a predetermined out-of-step determination criterion. During the stop period, a voltage controller sets, to a fixed voltage, all coils other than the coil where the back electromotive voltage is measured

SUMMARY OF THE INVENTION

The technique disclosed in JP-A-2009-261045 has the following problems. As shown in FIGS. 8A and 8B, in the technique disclosed in JP-A-2009-261045, energizing of a control voltage to a B-phase coil (a coil to continue energizing of a control voltage) is continued by a PWM even when energizing of a control voltage to an A-phase coil (a coil to stop energizing of a control voltage) is stopped. As shown in FIG. 9, noise generated in the on-off switching of energizing executed by the PWM is superimposed on a waveform of a back electromotive voltage of the A-phase coil during the energizing stop. Therefore, it is difficult to accurately measure a back electromotive voltage induced in the A-phase coil even when the voltage of the A-phase coil is measured. As a result, erroneous detection is liable to occur in the detection of an out-of-step of a stepping motor.

In the technique disclosed in JP-A-2012-016221, in order to suppress the noise generated by PWM modulation, all coils other than the coil where a back electromotive voltage is measured are set to a fixed voltage. This means that a PWM control of a motor is stopped and the motor is switched to a constant voltage control, which leads to a problem that the control of the stepping motor becomes more complicated.

The present invention has been made in view of the above circumstances, and one of objects of the present invention is to provide a motor control device and a method for detecting out-of-step that are capable of detecting an out-of-step of a stepping motor with high precision by a simple control method.

According to an illustrative embodiment of the present invention, there is provided a motor control device for controlling a stepping motor having at least two coils, through which coil currents having different phases flow respectively, and a rotor configured to rotate by periodically switching a phase of the coil currents flowing through each of the coils. The motor control device includes a controller, a back electromotive voltage measuring unit, and a detecting unit. The controller is configured to apply a pulse voltage being subjected to pulse width modulation to each of the coils and to provide a stop period to a target coil being subjected to switching of a direction of the coil current, during which the application of the pulse voltage to the target coil is temporarily stopped. The back electromotive voltage measuring unit is configured to measure a back electromotive voltage induced in the target coil during the stop period. The detecting unit is configured to detect an out-of-step of the stepping motor when the back electromotive voltage measured by the back electromotive voltage measuring unit satisfies a predetermined out-of-step determination criterion. The controller also performs a control to set on-duty of the pulse voltage applied to all of the coils except the target coil to be either 100% or 0% during the stop period.

According to the present invention, it is possible to detect an out-of-step of a stepping motor with high precision by a simple control method.

DETAILED DESCRIPTION

Hereinafter, illustrative embodiments of the present invention will be described in detail with reference to accompanying drawings.

Figure 1:
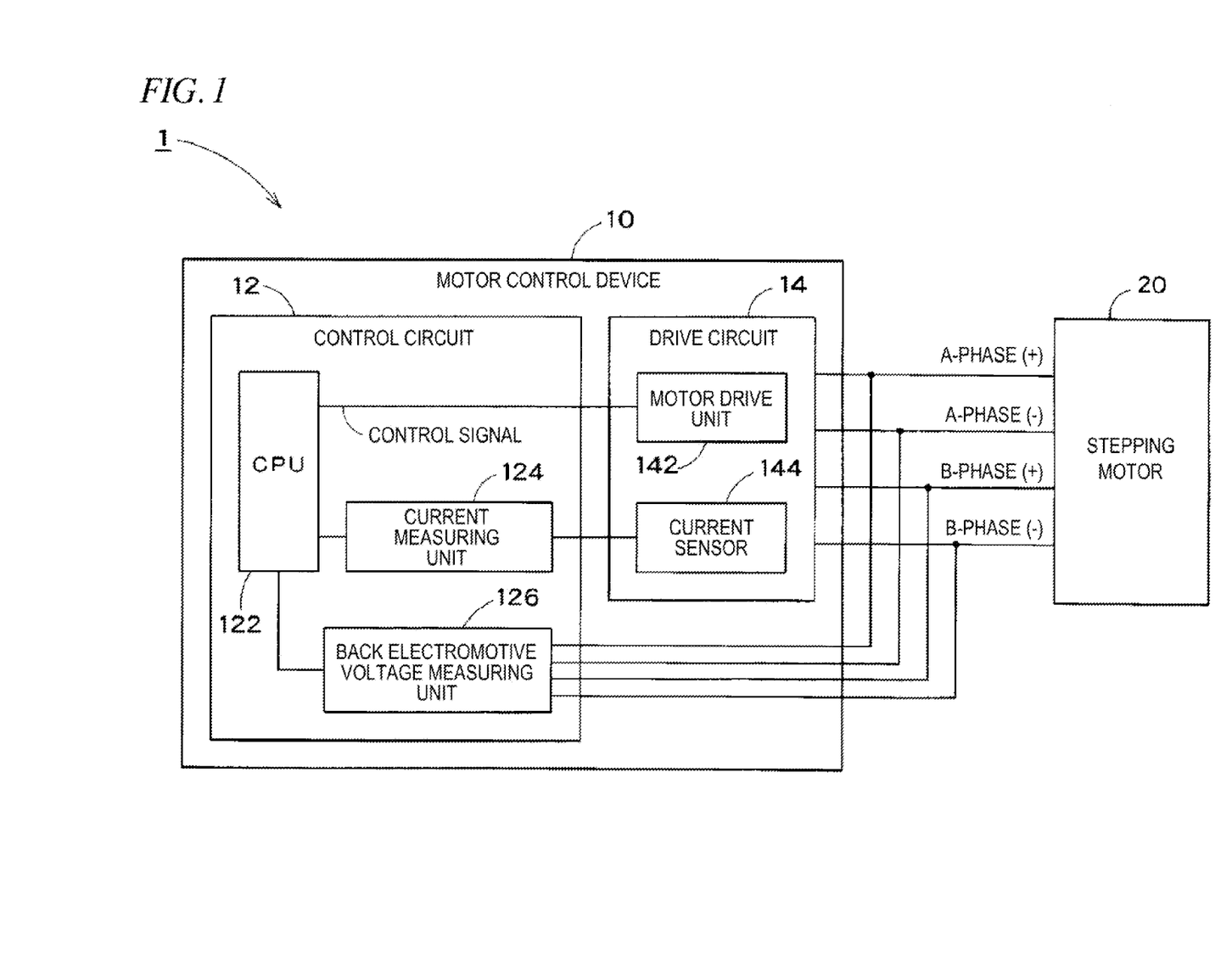
FIG. 1 is a block diagram showing a configuration of a stepping motor system according to illustrative embodiments of the present invention.

FIG. 1 is a block diagram showing a configuration of a stepping motor system 1 according to illustrative embodiments according to the present invention.

As shown in FIG. 1, the stepping motor system 1 includes a motor control device 10 and a stepping motor 20. The motor control device 10 is a module for controlling the stepping motor 20. The stepping motor 20 is a two-phase stepping motor driven by excitation of two-phases of an A-phase and a B-phase. The stepping motor 20 is driven in a bipolar manner and used as, for example, an actuator for an air conditioner installed in a vehicle.

The motor control device 10 includes a control circuit 12 and a drive circuit 14. The control circuit 12 is a circuit for controlling the drive circuit 14. The control circuit 12 includes a central processing unit (hereinafter, referred to as "CPU") 122, a current measuring unit 124, and a back electromotive voltage measuring unit 126. The drive circuit 14 is a circuit for driving the stepping motor 20. The drive circuit 14 includes a motor drive unit 142 and a current sensor 144.

The CPU 122 is a processor which generates a control signal for controlling the voltage applied to the stepping motor 20 based on the measurement result (to be described later) supplied from the current measuring unit 124 and supplies the generated control signal to the motor drive unit 142. The CPU 122 stores the settings of a normal target current and a target current in a stop period.

The current measuring unit 124 is a module which measures a current (hereinafter, referred to as "coil current") flowing through the coil of each phase of the stepping motor 20 based on the current sensing results (to be described later) supplied from the current sensor 144 and supplies the measured results to the CPU 122.

The back electromotive voltage measuring unit 126 is a module which measures a back electromotive voltage induced in the coil of each phase of the stepping motor 20 and supplies the measured results to the CPU 122.

The motor drive unit 142 is a module which applies a voltage to the coil of each phase of the stepping motor 20 based on the control signal supplied from the CPU 122.

The current sensor 144 is a module which senses the coil current of the stepping motor 20 and supplies the current sensing results to the current measuring unit 124.

Figure 2:
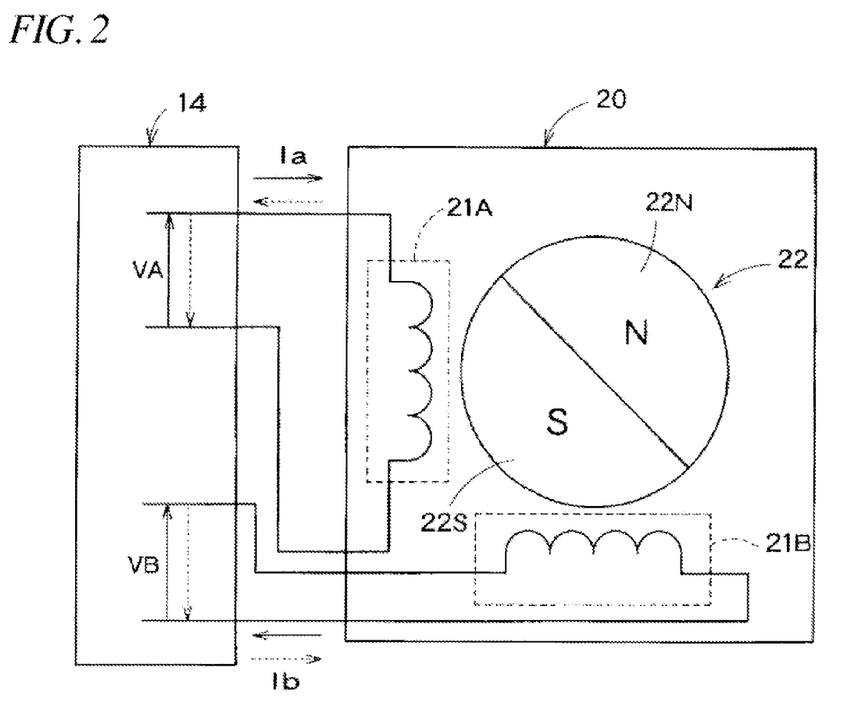
FIG. 2 is a circuit diagram showing the configuration of the stepping motor system according to the illustrative embodiments of the present invention.

FIG. 2 is a circuit diagram showing the configuration of the stepping motor system 1 according to the illustrative embodiments of the present invention.

As shown in FIG. 2, the stepping motor 20 includes two coils 21A and 21B, a rotor 22, and a plurality of stator yokes (not shown).

The coil 21A is an A-phase coil. The coil 21B is a B-phase coil. Each of the coils 21A and 21B excites a stator yoke (not shown). Each of the coils 21A and 21B is connected to the drive circuit 14. Coil voltages VA and VB, which are different from each other, are applied to each of the coils 21A and 21B. Coil currents Ia and Ib having different phases are flowing through each of the coils 21A and 21B.

The rotor 22 includes a multi-pole permanent magnet magnetized such that a south pole 22S and a north pole 22N are alternately reversed along a circumferential direction. The rotor 22 is rotated by periodically switching the phases of the coil currents Ia and Ib flowing through the coils 21A and 21B of each phase.

The polarity of the coil current Ia flowing through the coil 21A is switched in a predetermined cycle, i.e., switched to a direction indicated by a dashed-line arrow from a direction indicated by a solid-line arrow. The polarity of the coil current Ib flowing through the coil 21B is switched in a predetermined cycle, i.e., switched to a direction indicated by a dashed-line arrow from a direction indicated by a solid-line arrow.

The coil voltage VA applied to the coil 21A is a pulse voltage subjected to pulse width modulation and the polarity thereof is switched in a predetermined cycle, i.e., switched to a direction indicated by a dashed-line arrow from a direction indicated by a solid-line arrow. When the coil voltage VA is applied in the direction of the solid-line arrow, the coil current Ia flows in the direction of the solid-line arrow. When the coil voltage VA is applied in the direction of the dashed-line arrow, the coil current Ia flows in the direction of the dashed-line arrow. The coil voltage VB applied to the coil 21B is also similar to the coil voltage VA.

The CPU 122 and the motor drive unit 142 (refer to FIG. 1) operate as a controller for applying the pulse voltage subjected to the pulse width modulation to each of the coils 21A and 21B of the stepping motor 20.

Hereinafter, the CPU 122 and the motor drive unit 142 may be collectively referred to as "controller."

The back electromotive voltage measuring unit 126 (refer to FIG. 1) measures a back electromotive voltage induced in the coil during a stop period in which the direction of the coil current flowing through the coil (coils 21A and 21B) of one phase is switched. The controller stops the application of the pulse voltage to the coil when the direction of the coil current flowing through the coil (coils 21A and 21B) of one phase is switched. Hereinafter, a period where the application of the pulse voltage to the coil is stopped may be referred to as "stop period."

Figure 3:
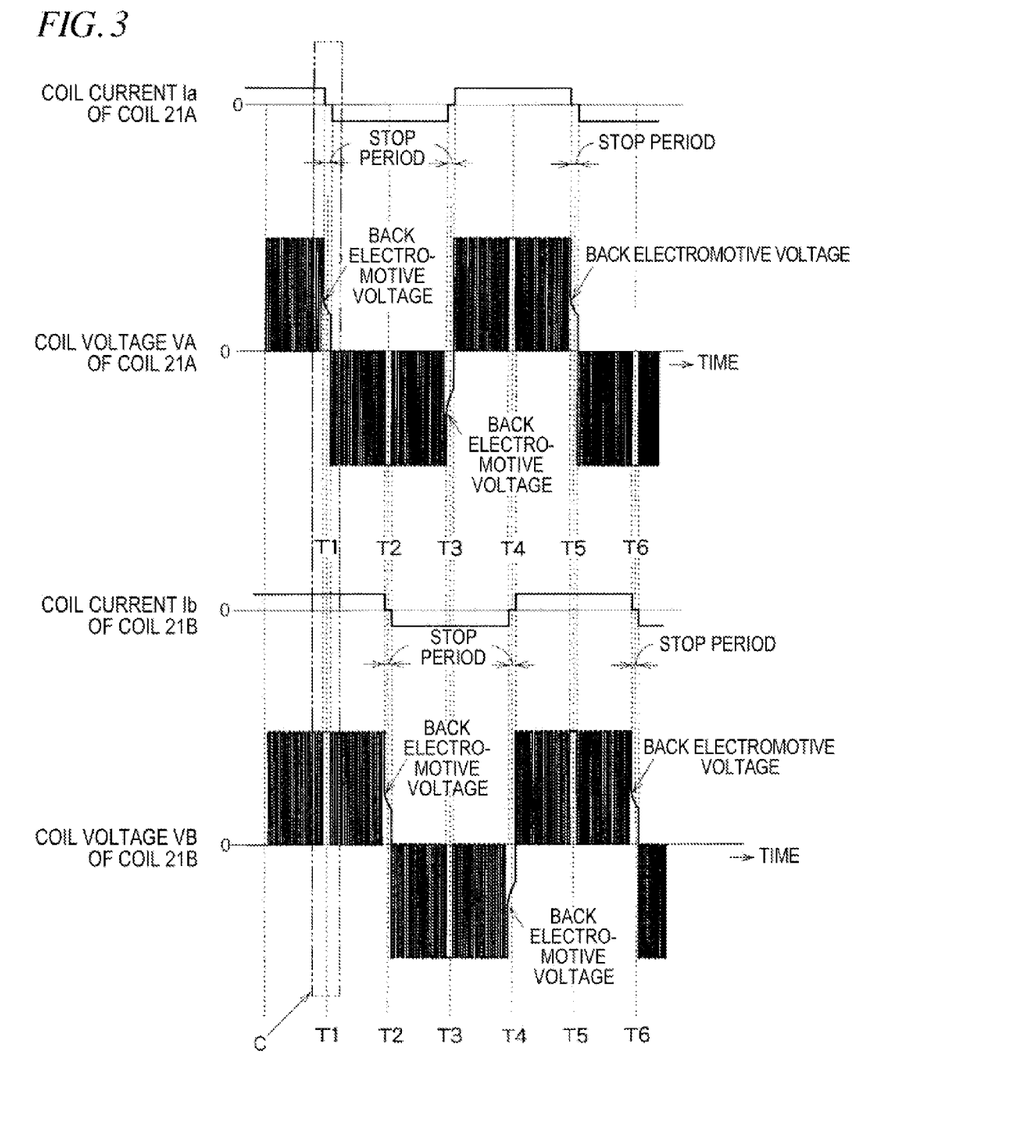
FIG. 3 is a schematic waveform diagram showing the coil current and coil voltage of each coil.

FIG. 3 is a schematic waveform diagram showing the coil current Ia and the coil voltage VA of the coil 21A and the coil current Ib and the coil voltage VB of the coil 21B in FIG. 2. The regions of FIG. 3 where the coil voltages VA and VB are filled indicate that the pulse voltage having an extremely fine pulse width is applied to the coils 21A and 21B.

As described above, the pulse voltage is applied to the coils 21A and 21B (refer to FIG. 2) by the controller. The back electromotive voltage induced in the coils 21A and 21B during the stop period is measured by the back electromotive voltage measuring unit 126 (refer to FIG. 1).

As shown in FIG. 3, the pulsed coil voltage VA is applied to the coil 21A (refer to FIG. 2), so that the coil current Ia flows through the coil 21A. The pulse of the coil voltage VA becomes positive and negative repeatedly in a predetermined cycle. The polarity of the coil current Ia, i.e., the flowing direction of the coil current Ia is changed in a predetermined cycle in response to the pulse of the coil voltage VA. When the polarity of the coil current Ia is changed, there is provided the stop period when the application of the pulse voltage to the coil 21A is stopped so as to cause the coil current Ia to be zero. In this stop period, a back electromotive voltage is induced in the coil 21A.

Meanwhile, the pulsed coil voltage VB is applied to the coil 21B (refer to FIG. 2), so that the coil current Ib flows through the coil 21B. The pulse of the coil voltage VB becomes positive and negative repeatedly in the same cycle as the coil 21A while being delayed by a predetermined phase with respect to the coil 21A. The flowing direction of the coil current Ib is changed in a predetermined cycle in response to the pulse of the coil voltage VB. When the polarity of the coil current Ib is changed, there is provided the stop period when the application of the pulse voltage to the coil 21B is stopped so as to cause the coil current Ib to be zero. In this stop period, a back electromotive voltage is induced in the coil 21B.

When the coil currents Ia and Ib flow through each of the coils 21A and 21B (refer to FIG. 2), the stator yokes of the coils 21A and 21B are excited in response to the polarities of the coil currents Ia and Ib. Thereby, the rotor 22 is rotated in a predetermined step unit.

Figure 4:
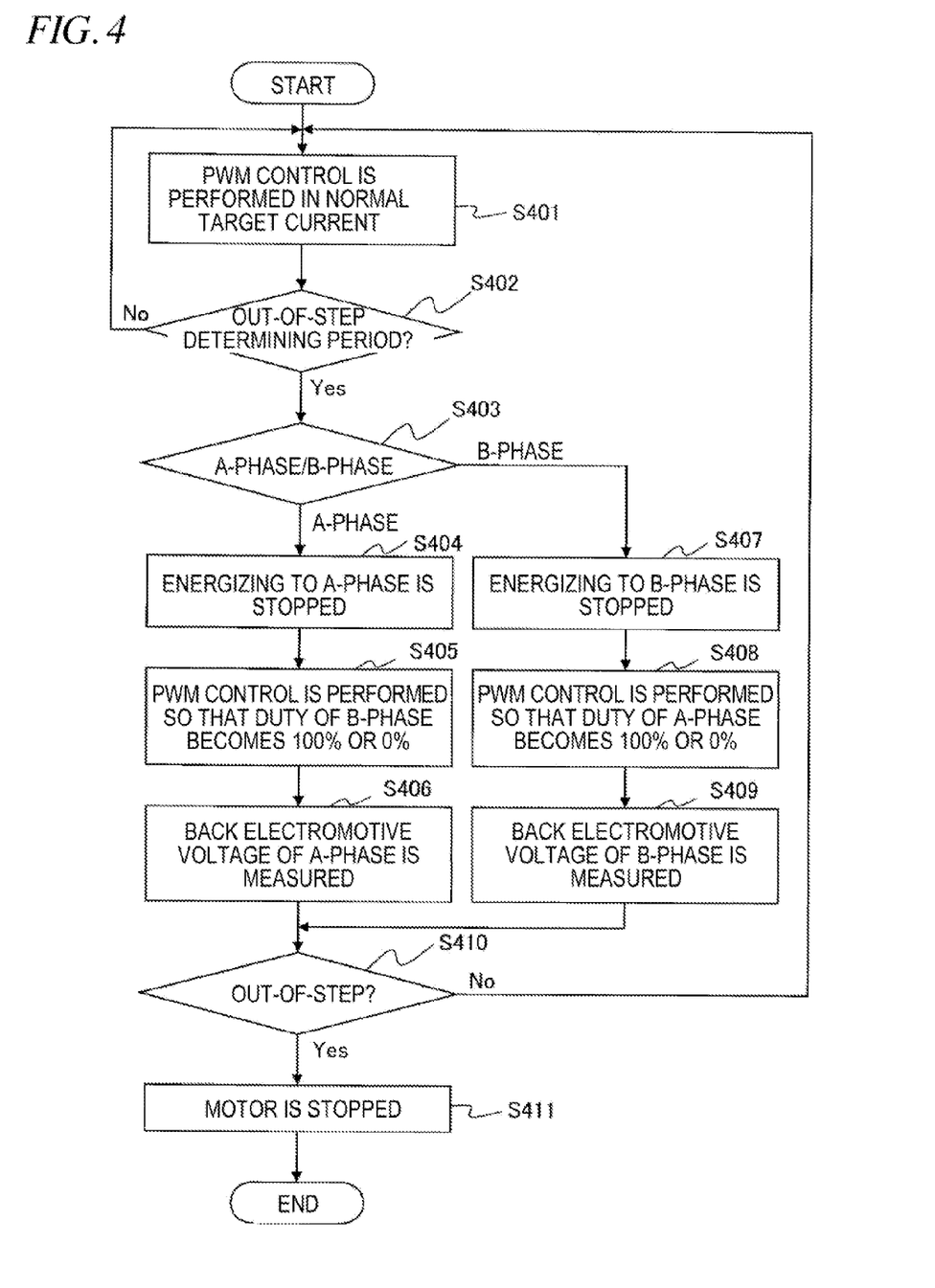
FIG. 4 is a flow chart showing a process of detecting an out-of-step of the stepping motor in the illustrative embodiment.

FIG. 4 is a flow chart showing a process of detecting an out-of-step of the stepping motor 20 in the first illustrative embodiment.

As shown in FIG. 4, the motor control device 10 repeats the out-of-step detection process till the stop of the stepping motor from the start of the driving of the stepping motor 20.

In Step S401 (PWM control period), the controller applies the pulse voltage to the coils 21A and 21B (refer to FIG. 2). Thereby, the coil currents Ia and Ib flow through each of the coils 21A and 21B. The controller performs the PWM control so that a normal target current Ibt flows through the coils 21A and 21B.

In Step S402, the CPU 122 of the controller determines whether the period is an out-of-step determined period or not. When it is determined that the period is not the out-of-step determined period (No), the CPU 122 repeats the PWM control of Step S401. When it is determined that the period is the out-of-step determined period, the controller performs the process of Step S403.

In Step S403, the CPU 122 of the controller determines whether to measure the back electromotive voltage of the A-phase or the B-phase. When it is determined that the back electromotive voltage of the A-phase coil 21A is measured, the CPU 122 performs the process of Step S404. When it is determined that the back electromotive voltage of the B-phase coil 21B is measured, the CPU 122 performs the process of Step S407.

The control of the A-phase and the control of the B-phase are alternately changed. The process of Steps S404 to S406 is an energizing stop process of the A-phase coil 21A. The process of Steps S407 to S409 is an energizing stop process of the B-phase coil 21B.

Figure 5:
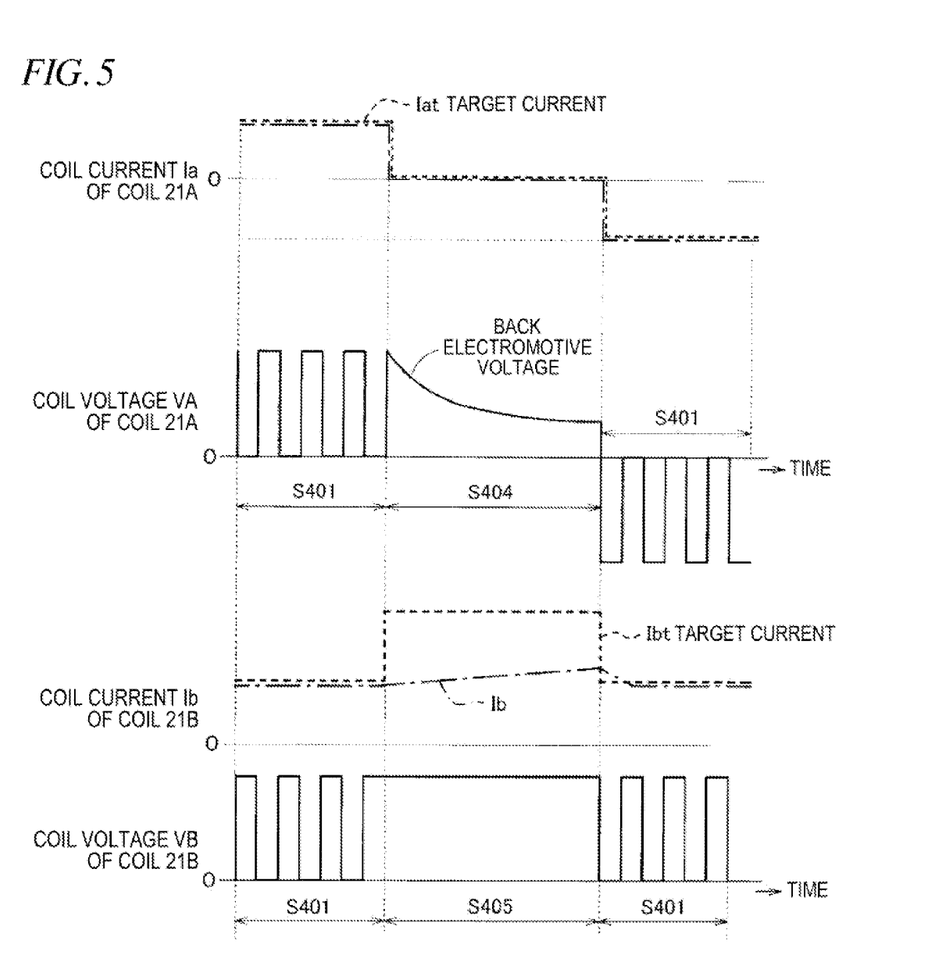
FIG. 5 is an enlarged view of a rectangular part labeled C in FIG. 3.

In Step S404 (energizing stop), the controller stops the application of the pulse voltage to the A-phase coil 21A for a predetermined stop period. Thereby, as shown in FIG. 5 (to be described later) or time T1, T3 in FIG. 3, the coil current Ia of the coil 21A becomes zero. The stop period is arbitrarily set by the CPU 122 (refer to FIG. 1). For example, the CPU 122 may set a predetermined stop period or may receive the setting of the stop period from the outside of the stepping motor system 1.

In Step S405 (constant voltage control), the controller sets the target current Ibt of the B-phase so that an on-duty of the pulse voltage applied to the B-phase coil 21B becomes 100% or 0% for a predetermined stop period.

The controller of the first illustrative embodiment sets the target current Ibt of the B-phase at time T1 in FIG. 3 to be very large and sets the target current Ibt of the B-phase at time T3 in FIG. 3 to be very small. Thereby, the coil current Ib does not reach the target current Ibt, so that the on-duty of the pulse voltage applied to all coils (coil 21B) other than the coil 21A where the back electromotive voltage is measured during the stop period becomes 100%.

Further, the controller may set the target current Ibt of the B-phase at time T1 in FIG. 3 to be very small and set the target current Ibt of the B-phase at time T3 in FIG. 3 to be very large. Thereby, the coil current Ib does not reach the target current Ibt, so that the on-duty of the pulse voltage applied to all coils (coil 21B) other than the coil 21A where the back electromotive voltage is measured during the stop period becomes 0%.

By causing the on-duty of the pulse voltage to be 100% or 0%, the coil voltage VB of the coil 21B during the stop period keeps a constant voltage, so that noise associated with the application of the coil voltage VB does not occur. As a result, the noise associated with the application of the coil voltage VB is not superimposed on the coil voltage VA of the coil 21A during the stop period.

In Step S406 (back electromotive voltage measurement), the CPU 122 of the controller measures the coil voltage VA of the coil 21A by the back electromotive voltage measuring unit 126 over a predetermined stop period. At this time, the noise associated with the application of the coil voltage VB does not occur, so that the noise is not superimposed on the coil voltage VA of the coil 21A during the stop period. Accordingly, the CPU 122 can accurately measure the back electromotive voltage induced in the coil 21A, so that it is possible to prevent erroneous detection of an out-of-step. When the process of Step S406 is ended, the controller performs the process of the Step S410.

Steps S407 to S409 correspond to a process where the A-phase and B-phase are exchanged with each other in Steps S404 to S406.

In Step S407 (energizing stop), the controller stops the application of the pulse voltage to the B-phase coil 21B for a predetermined stop period. Thereby, as indicated by time T2, T4 in FIG. 3, the coil current Ib of the coil 21B becomes zero.

In Step S408 (constant voltage control), the controller sets a target current Iat of the A-phase so that the on-duty of the pulse voltage applied to the A-phase coil 21A becomes 100% or 0% for a predetermined stop period.

The controller sets the target current Iat of the A-phase at time T2 in FIG. 3 to be very small and sets the target current Iat of the A-phase at time T4 in FIG. 3 to be very large. Thereby, the coil current Ia does not reach the target current Iat, so that the on-duty of the pulse voltage applied to all coils (coil 21A) other than the coil 21B where the back electromotive voltage is measured during the stop period becomes 100%.

Further, the controller may set the target current Iat of the A-phase at time T2 in FIG. 3 to be very large and set the target current Iat of the A-phase at time T4 in FIG. 3 to be very small. Thereby, the coil current Ia does not reach the target current Iat, so that the on-duty of the pulse voltage applied to all coils (coil 21A) other than the coil 21B where the back electromotive voltage is measured during the stop period becomes 0%.

By causing the on-duty of the pulse voltage to be 100% or 0%, the coil voltage VA of the coil 21A during the stop period keeps a constant voltage, so that noise associated with the application of the coil voltage VA does not occur. As a result, the noise associated with the application of the coil voltage VA is not superimposed on the coil voltage VB of the coil 21B during the stop period.

In Step S409 (back electromotive voltage measurement), the CPU 122 of the controller measures the coil voltage VB of the coil 21B by the back electromotive voltage measuring unit 126 over a predetermined stop period. At this time, the noise associated with the application of the coil voltage VA does not occur, so that the noise is not superimposed on the coil voltage VB of the coil 21B during the stop period. Accordingly, the CPU 122 can accurately measure the back electromotive voltage induced in the coil 21B, so that it is possible to prevent erroneous detection of an out-of-step. When the process of Step S409 is ended, the controller performs the process of the Step S410.

In Step S410 (out-of-step determination), the CPU 122 determines whether or not the stepping motor 20 is in an out-of-step based on the measured back electromotive voltage. The CPU 122 determines whether or not the measurement result of the back electromotive voltage measuring unit 126 meets a predetermined out-of-step determination criterion. That is, the CPU 122 operates as an out-of-step detection unit for detecting an out-of-step of the stepping motor 20 when the measured back electromotive voltage meets the predetermined out-of-step determination criterion. When it is determined that the stepping motor 20 is not in the out-of-step (No), the CPU 122 returns to the process of Step S401. When it is determined that the stepping motor 20 is in the out-of-step (Yes), the CPU 122 performs the process of Step S411. Here, the predetermined out-of-step determination criterion means that the back electromotive voltage in one phase is equal to or less than a threshold, for example. In the first illustrative embodiment, the noise is not superimposed on the measured back electromotive voltage, so that it is possible to detect the out-of-step of the stepping motor 20 with high precision.

In Step S411, the CPU 122 stops the driving of the stepping motor 20 and then the process of FIG. 4 is ended.

As described in the above, the motor control device 10 of the first illustrative embodiment can detect an out-of-step of the stepping motor with high precision by a simple control method.

In the first illustrative embodiment, a stepping motor of two phases (A-phase and B-phase) has been described as an example. However, the present invention may be applied to a stepping motor of three or more phases.

Further, the CPU 122 of the controller may set the target current of the other coil where energizing is not stopped to be 1.5 times larger than the target current during a normal operation. Thereby, the on-duty of the pulse voltage applied to all coils other than the coil where the back electromotive voltage is measured can be 100%.

FIG. 5 is an enlarged view of a rectangular part labeled C in FIG. 3.

As shown in the waveform diagram of the coil current Ia of the coil 21A in FIG. 5, the coil current Ia is controlled by the target current Iat. Further, as shown in the waveform diagram of the coil current Ib of the coil 21B, the coil current Ib is controlled by the target current Ibt.

In the PWM control period of the first Step S401, the target current Iat is a predetermined positive value. The coil current Ia follows the target current Iat. The coil voltage VA of the coil 21A has the on-duty of less than 100% but greater than 0%. At this time, the target current Ibt is a predetermined positive value. The coil current Ib follows the target current Ibt. The coil voltage VB of the coil 21B has the on-duty of less than 100% but greater than 0%.

In the energizing stop period of Step S404, the target current Iat is 0 [A]. The coil current Ia follows the target current Iat, so that the coil current Ia is 0 [A]. During the energizing stop period, the coil voltage VA is measured as a back electromotive voltage.

At this time, the coil current Ib and coil voltage VB of the coil 21B are in a target current change period of Step S405. The target current Ibt is a very large positive value. The coil current Ib is gradually increased but cannot reach the target current Ibt. The coil voltage VB of the coil 21B has an on-duty of 100%. Thereby, the B-phase coil 21B is in the same state as in the case of being subjected to a constant voltage control since the on-state of the coil voltage VB is maintained even in the PWM control.

When the periods of the Steps S404 and S405 are ended, a PWM control period of next Step S401 is started. The target current Ibt of the B-phase returns to an original value and the PWM control is resumed.

Assumed that the target current Ibt of the B-phase is too small in the target current change period of Step S405, the coil current Ib reaches the target current Ibt. From this time point, the coil voltage VB of the coil 21B has the on-duty of less than 100% but greater than 0%, as shown in FIG. 9. The pulse of the coil voltage VB is superimposed as noise on the back electromotive voltage of the coil voltage VA. Accordingly, it is difficult to accurately measure the back electromotive voltage of the coil voltage VA. As a result, there is a risk that an erroneous detection of the out-of-step is caused.

Meanwhile, in the first illustrative embodiment of the present invention, an example has been described where the stepping motor 20 in FIG. 1 is a stepping motor of two phases. However, the present invention is not limited thereto. For example, the present invention may be applied to a stepping motor of three or more phases. In this case, the energizing stop (S404, S407) in FIG. 4 is performed on the coil of one phase (A-phase where the back electromotive voltage is measured) and the constant voltage control (S405, S408) in FIG. 4 is performed on all coils other than the one coil where the back electromotive voltage is measured.

According to the first illustrative embodiment of the present invention, the constant voltage control (S405, S408) is performed on all coils other than the coil where the back electromotive voltage is measured while the energizing stop (S404, S407) in FIG. 4 is performed on the coil where the back electromotive voltage is measured. Therefore, the noise due to the application of the pulse voltage to all coils other than the coil where the back electromotive voltage is measured is not superimposed on the coil voltage of the coil where the back electromotive voltage is measured. In the back electromotive voltage measurement (S406, S409), it is possible to accurately measure the back electromotive voltage induced in the coil.

In the out-of-step determination (S410), it is determined whether or not the measurement result of the back electromotive voltage measurement (S406, S409) meets the predetermined out-of-step determination criterion. Thereby, it is possible to detect the out-of-step of the stepping motor 20 with high precision.

From the experiment, the inventors of the present invention have found that an erroneous determination of the out-of-step does not occur in the stepping motor system 1 according to the present invention, as compared to an system according to the comparative example shown in FIGS. 8A, 8B and FIG. 9 where an out-of-step is erroneously determined at a predetermined percentage. Therefore, it can clearly be said that the present invention is advantageous.

Figure 6:
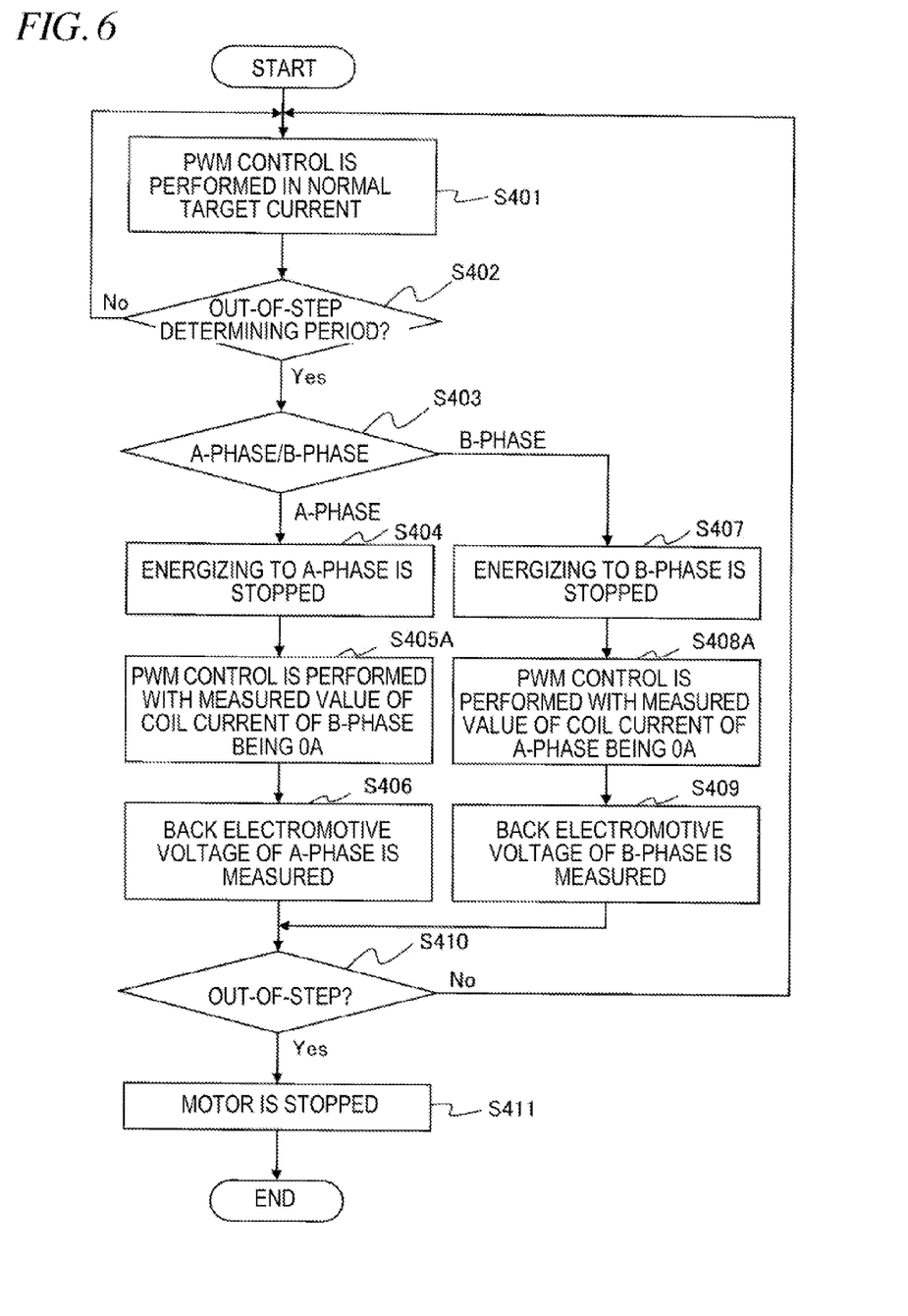
FIG. 6 is a flow chart showing a process of detecting an out-of-step of a stepping motor according to a second illustrative embodiment.

Hereinafter, a second illustrative embodiment according to the present invention will be described. In the second illustrative embodiment, the current measurement value of each coil is changed, instead of changing the target current of each coil as described in the first illustrative embodiment. FIG. 6 is a flow chart showing a process of detecting an out-of-step of a stepping motor 20 according to the modified example. The same element will be denoted by the same reference numeral as the process of detecting the out-of-step of the stepping motor 20 of the illustrative embodiment in FIG. 4.

As shown in FIG. 6, after the process is started, the process of Steps S401 to S404 and S407 is the same as each process in FIG. 4.

In Step S405A (current measurement value change), the controller performs a PWM control for a predetermined stop period with the current measurement value Ib1 of the B-phase coil 21B being 0 [A]. The CPU 122 serving as a controller performs the PWM control with the current measurement value Ib1 of the B-phase coil 21B being 0 [A] by setting, to zero, a variable indicating the current measurement value Ibi of the B-phase coil 21B, for example. However, the present invention is not limited thereto. The CPU 122 may output an output signal indicating 0 [A] by controlling the current measuring unit 124.

The controller of the second illustrative embodiment performs the PWM control with the current measurement value Ib1 of the coil current Ibo flowing through the B-phase coil 21B at time T1, T3 in FIG. 3 being 0 [A]. Thereby, the on-duty of the pulse voltage applied to all coils (coil 21B) other than the coil 21A where the back electromotive voltage is measured during the stop period becomes 100%.

Further, the controller may cause the current measurement value Ib1 of the B-phase coil 21B at time T1, T3 in FIG. 3 to be half or less (0.5 times or less) than the existing value. Alternatively, the sign of the current measurement value Ib1 may be inverted. Thereby, the on-duty of the pulse voltage applied to all coils (coil 21B) other than the coil 21A where the back electromotive voltage is measured during the stop period becomes 100%.

Further, the controller may cause the current measurement value Ib1 of the B-phase coil 21B at time T1, T3 in FIG. 3 to be ten times greater or more than the existing value. Thereby, the on-duty of the pulse voltage applied to all coils (coil 21B) other than the coil 21A where the back electromotive voltage is measured during the stop period becomes 0%.

By causing the on-duty of the pulse voltage to be 100% or 0%, the coil voltage VB of the coil 21B during the stop period keeps a constant voltage, so that noise associated with the application of the coil voltage VB does not occur. As a result, the noise associated with the application of the coil voltage VB is not superimposed on the coil voltage VA of the coil 21A during the stop period.

In Step S408A (current measurement value change), the controller performs a PWM control for a predetermined stop period with a current measurement value of the A-phase coil 21A being 0 [A].

The controller of the second illustrative embodiment performs the PWM control with a current measurement value of the A-phase coil 21A at time T2, T4 in FIG. 3 being 0 [A]. Thereby, the on-duty of the pulse voltage applied to all coils (coil 21A) other than the coil 21B where the back electromotive voltage is measured during the stop period becomes 100%.

Further, the controller may cause the current measurement value of the A-phase coil 21A at time T2, T4 in FIG. 3 to be half or less (0.5 times or less) than the existing value. Alternatively, the sign of the current measurement value may be inverted. Thereby, the on-duty of the pulse voltage applied to all coils (coil 21A) other than the coil 21B where the back electromotive voltage is measured during the stop period becomes 100%.

Further, the controller may cause the current measurement value of the A-phase coil 21A at time T2, T4 in FIG. 3 to be ten times greater than the existing value. Thereby, the on-duty of the pulse voltage applied to all coils (coil 21A) other than the coil 21B where the back electromotive voltage is measured during the stop period becomes 100%.

By causing the on-duty of the pulse voltage to be 100% or 0%, the coil voltage VA of the coil 21A during the stop period keeps a constant voltage, so that noise associated with the application of the coil voltage VA does not occur. As a result, the noise associated with the application of the coil voltage VA is not superimposed on the coil voltage VB of the coil 21B during the stop period.

The process of Steps S406, S409 to S411 is the same as each process in FIG. 4.

Also in a control performed in this way, the CPU 122 can accurately measure the back electromotive voltage induced in the coil 21A, so that it is possible to prevent erroneous detection of an out-of-step.

Figure 7:
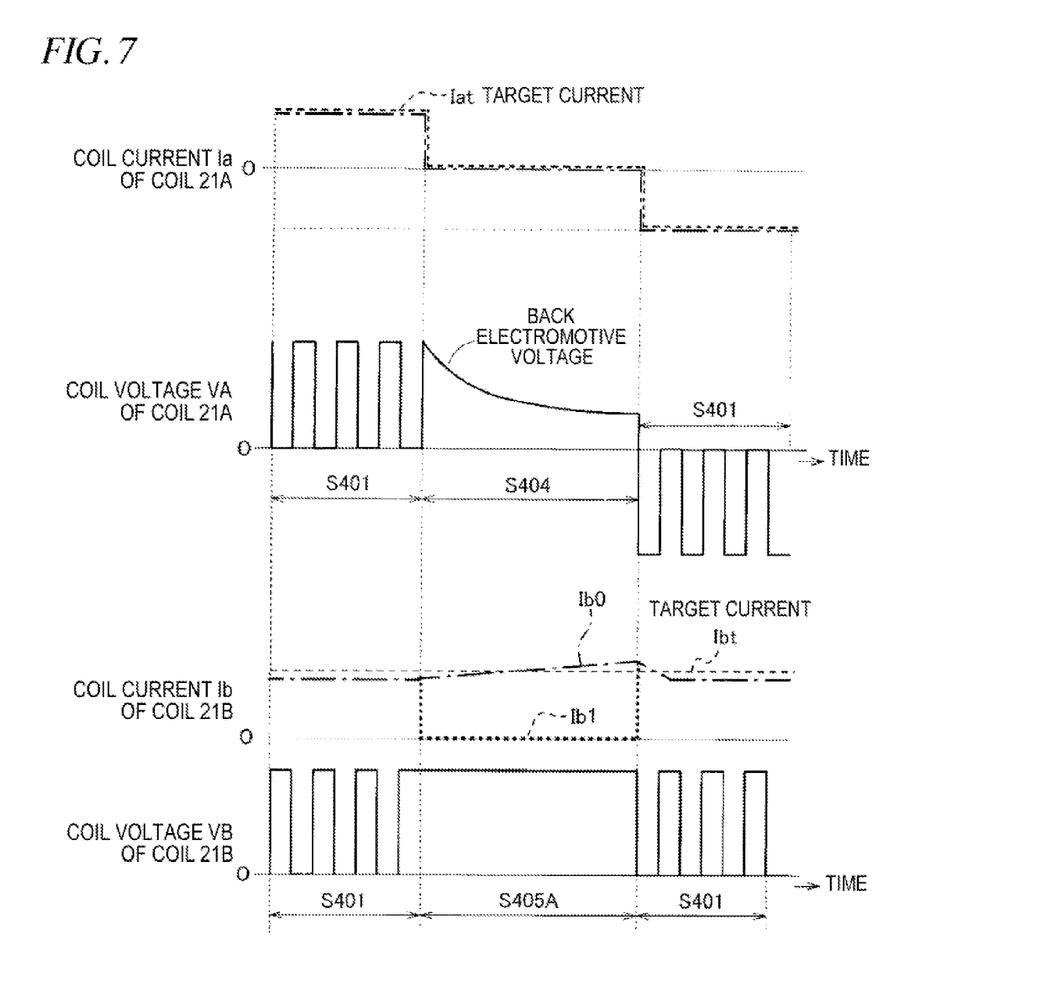
FIG. 7 is an explanatory view showing an out-of-step detecting operation of the second illustrative embodiment.

FIG. 7 is an explanatory view showing an out-of-step detecting operation according to the second illustrative embodiment. FIG. 7 corresponds to FIG. 5 that is an enlarged view of the rectangular part labeled C in FIG. 3.

As shown in FIG. 7, the PWM control period of the first Step S401 is the same as that of FIG. 5.

In the energizing stop period of Step S404, the target current Iat is 0 [A]. The coil current Ia follows the target current Iat, so that the coil current Ia is 0 [A]. During the energizing stop period, the coil voltage VA is measured as a back electromotive voltage.

When the coil 21A is in the energizing stop period, the coil current Ib and coil voltage VB of the coil 21B are in the current measurement value change period of Step S405A. The current measurement value Ib1 of the coil 21B is 0 [A] and the coil current Ib0 is gradually increased. The coil voltage VB of the coil 21B has an on-duty of 100%. Thereby, the B-phase coil 21B is in the same state as in the case of being subjected to a constant voltage control since the on-state of the coil voltage VB is maintained even in the PWM control.

When the periods of the Steps S404 and S405A are ended, a PWM control period of next Step S401 is started. The current measurement value Ib1 of the B-phase returns to the value of the coil current Ib0 actually flowing through the coil 21B and the PWM control is resumed.

According to the second illustrative embodiment of the present invention, the constant voltage control (S405A, S408A) by the change of the current measurement value is performed on all coils other than the coil where the back electromotive voltage is measured while the energizing stop (S404, S407) in FIG. 6 is performed on the coil where the back electromotive voltage is measured. Therefore, the noise due to the application of the pulse voltage to all coils other than the coil where the back electromotive voltage is measured is not superimposed on the coil voltage of the coil where the back electromotive voltage is measured. In the back electromotive voltage measurement (S406, S409), it is possible to accurately measure the back electromotive voltage induced in the coil.

In the out-of-step determination (S410), it is determined whether or not the measurement result of the back electromotive voltage measurement (S406, S409) meets the predetermined out-of-step determination criterion. Thereby, it is possible to detect the out-of-step of the stepping motor 20 with high precision.

In the first and second illustrative embodiments, examples have been described where the coil currents Ia and Ib are square waves. However, the present invention is not limited thereto. For example, the present invention may be applied to a case where the coil currents Ia and Ib are a non-linear wave such as a sine wave.

Further, in the first and second illustrative embodiments, examples have been described where the CPU 122 and the motor drive unit 142 in FIG. 1 operate as the controller. However, the configuration of controller is not limited to the usage of CPU 122 and the motor drive unit 142. For example, the controller may be configured by a logic circuit. Furthermore, the out-of-step detection unit and the voltage controller may also be configured by a logic circuit.

At least a part of the motor control device 10 according to the first and second illustrative embodiments may be configured by hardware, or may be configured by software.

The present invention is not only be applied to two phase excitation for a two-phase motor but may also be applied to one phase excitation or one-two phase excitation for a two-phase motor, or two-three phase excitation for a three-phase motor.

The present invention is not limited to the illustrative embodiments but can be embodied by modifying the components without departing from the gist of the invention. Further, various inventions can be made by appropriately combining a plurality of components described in the above illustrative embodiment. For example, some of all components described in the above illustrative embodiment may be removed. Furthermore, the components according to another illustrative embodiment may be appropriately combined.

What is claimed is:

1. A motor control device for controlling a stepping motor having at least two coils, through which coil currents having different phases flow respectively, and a rotor configured to rotate by periodically switching a phase of the coil currents flowing through each of the coils, the motor control device comprising:

a controller configured to apply a pulse voltage being subjected to pulse width modulation to each of the coils and to provide a stop period to a target coil being subjected to switching of a direction of the coil current, during which the application of the pulse voltage to the target coil is temporarily stopped;

a back electromotive voltage measuring unit configured to measure a back electromotive voltage induced in the target coil during the stop period; and a detecting unit configured to detect an out-of-step of the stepping motor when the back electromotive voltage measured by the back electromotive voltage measuring unit satisfies a predetermined out-of-step determination criterion, wherein the controller performs a control to set on-duty of the pulse voltage applied to all of the coils except the target coil to be either 100% or 0% during the stop period, by changing a target current of all of the coils except the target coil during the stop period, or by performing a feed-back control while changing a measured value of the coil current flowing through the all of the coils except the target coil during the stop period.

2. The motor control device according to claim 1, wherein the controller changes the target current of all of the coils except the target coil during the stop period to a level that largely differs compared to the target current set for the coils at a normal period except the stop period.

3. The motor control device according to claim 2, wherein the controller changes the target current of all of the coils except the target coil during the stop period to a level that differs for 1.5 times or more than the target current set for the coils at the normal period except the stop period.

4. The motor control device according to claim 1 further comprising:
a current sensor configured to sense the coil current of the coils and supplies current sensing results; and
a current measuring unit configured to measure the coil current flowing through the coils based on the current sensing results supplied from the current sensor and supplies the measured results to the controller as the measured value.

5. The motor control device according to claim 4, wherein the controller changes the measured value by controlling the current measuring unit to output a signal to the controller indicating that the measured results is zero during the stop period.

6. The motor control device according to claim 1, wherein the controller changes the measured value by setting a variable to zero, the variable indicating the measured value of the coil current flowing through the all of the coils except the target coil during the stop period.

7. The motor control device according to claim 1, wherein the controller changes the measured value to a level half or less than the measured value originally measured during the stop period.

8. The motor control device according to claim 1, wherein the controller changes the measured value by applying sign inversion to the measured value originally measured during the stop period.

9. The motor control device according to claim 1, wherein the controller changes the measured value to a level ten times greater or more than the measured value originally measured during the stop period.

10. A method for detecting out-of-step occurring in a stepping motor having at least two coils, through which coil currents having different phases flow respectively, and a rotor configured to rotate by periodically switching a phase of the coil currents flowing through each of the coils, the method comprising:
applying a pulse voltage being subjected to pulse width modulation to each of the coils;
providing a stop period to a target coil being subjected to switching of a direction of the coil current, during which the application of the pulse voltage to the target coil is temporarily stopped;
setting on-duty of the pulse voltage applied to all of the coils except the target coil to be either 100% or 0% during the stop period,
by changing a target current of all of the coils except the target coil during the stop period, or
by performing a feed-back control while changing a measured value of the coil current flowing through the all of the coils except the target coil during the stop period;
measuring a back electromotive voltage induced in the target coil during the stop period; and
detecting an out-of-step of the stepping motor when the back electromotive voltage satisfies a predetermined out-of-step determination criterion.

* * * * *